United States Patent [19]

Nonoyama et al.

[11] Patent Number: 6,082,196
[45] Date of Patent: Jul. 4, 2000

[54] PHYSICAL QUANTITY DETECTING DEVICE

[75] Inventors: Shigeru Nonoyama, Nishikamo-gun; Shigenori Yamauchi, Nisshin; Takamoto Watanabe, Nagoya, all of Japan

[73] Assignee: Denso Corporation, Kariya, Japan

[21] Appl. No.: 08/845,895

[22] Filed: Apr. 28, 1997

[30] Foreign Application Priority Data

Apr. 26, 1996 [JP] Japan .................................. 8-108315

[51] Int. Cl.$^7$ ...................................................... G01P 15/14
[52] U.S. Cl. ........................................................ 73/514.18
[58] Field of Search .......................... 73/514.32, 514.16, 73/514.17, 514.18, 514.36, 514.21, 862.381, 862.61, 862.626; 364/508, 565, 566, 571.01, 571.02, 571.04, 571.05; 340/669, 670

[56] References Cited

U.S. PATENT DOCUMENTS

| 4,636,649 | 1/1987 | Kimura et al. ........................... 250/574 |
| 4,987,779 | 1/1991 | McBrien ................................. 73/517 B |
| 5,095,750 | 3/1992 | Suzuki et al. ........................... 73/517 B |
| 5,128,624 | 7/1992 | Hoshino et al. .......................... 328/133 |

(List continued on next page.)

FOREIGN PATENT DOCUMENTS

| 369 352   | 5/1990  | European Pat. Off. . |
| 64-013419 | 1/1989  | Japan . |
| 3-085014  | 4/1991  | Japan . |
| 3-293565  | 12/1991 | Japan . |
| 5-026902  | 2/1993  | Japan . |
| 6-229777  | 8/1994  | Japan . |
| 7-128362  | 5/1995  | Japan . |

OTHER PUBLICATIONS

Spangler et al: "ISAAC–Integrated Silicon Automotive Accelerometer", Transducers '95—Eurosensors IX, Jun. 25–29, 1995, pp. 585–588.

Smith et al: "A 15b Electromechanical Sigma–Delta Converter for Acceleration Measurements", 1994 IEEE International Solid–State Circuits Conference, Session 9, TA 9.4, 1994, pp. 160–162.

Lu et al: "A Monolithic Surface Micromachined Accelerometer with Digital Output", 1995 IEEE International Solid–State Circuits Conference, Session 9, TA 9.4, 1995, pp. 160–161 and 356.

Nathanson et al: "The Resonant Gate Transistor", IEEE Transactions on Electron Device, vol. ED–14, No. 3, Mar. 1967, pp. 117–133.

Dunn et al: "Automobile Silicon Sensor Integration" SAE Technical Paper Series, 920471, Feb. 24–28, 1992, pp. 1–6.

Payne et al: "Surface Micromachines Accelerometer: A Technology Update", SAC Technical Paper Series, 910496, 1991, pp. 127–135.

Nathanson et al: "A Resonant–Gate Silicon Surface Transistor with High–Q Band–Pass Properties", Applied Physics Letters, vol. 7, No. 4, Aug. 15, 1965, pp. 84–86.

*Primary Examiner*—Hezron Williams
*Assistant Examiner*—Richard A. Moller
*Attorney, Agent, or Firm*—Pillsbury Madison & Sutro LLP

[57] ABSTRACT

A physical quantity detecting is capable of easily adjusting sensitivity and an offset of a detected output without being increased in size. In a signal processor for driving a sensor element in which fixed electrodes are disposed on both sides of a movable electrode displaced in response to acceleration, a signal generator generates PWM signals PA and PB in which an invalid control period during which the fixed electrodes are both deenergized only during a period corresponding to data M3 stored in a memory, is, at a predetermined ratio, inserted into a valid control period during which the fixed electrodes are alternately energized and their energization ratio is controlled so that the movable electrode is placed in position. Since the sensitivity of the sensor element to the acceleration changes according to the length of the invalid control period which does not contribute to control of the position of the movable electrode, its sensitivity can be easily adjusted by simply changing the value set in the memory.

10 Claims, 9 Drawing Sheets

U.S. PATENT DOCUMENTS

| | | | |
|---|---|---|---|
| 5,166,542 | 11/1992 | Matsubara et al. | 327/102 |
| 5,283,474 | 2/1994 | Oi et al. | 307/116 |
| 5,341,218 | 8/1994 | Kaneko et al. | 348/695 |
| 5,345,824 | 9/1994 | Sherman et al. | 73/517 B |
| 5,396,247 | 3/1995 | Watanabe et al. | 341/157 |
| 5,416,444 | 5/1995 | Yamauchi et al. | 331/45 |
| 5,428,352 | 6/1995 | Bennett | 340/870.37 |
| 5,440,501 | 8/1995 | Shimomura et al. | 364/560 |
| 5,465,604 | 11/1995 | Sherman | 73/1 DV |
| 5,477,196 | 12/1995 | Yamauchi et al. | 331/60 |
| 5,506,454 | 4/1996 | Hanzawa et al. | 307/10.1 |
| 5,511,421 | 4/1996 | Kudo | 73/514.32 |
| 5,525,899 | 6/1996 | Watanabe et al. | 324/166 |
| 5,540,095 | 7/1996 | Sherman et al. | 73/514.18 |
| 5,541,437 | 7/1996 | Watanabe et al. | 257/417 |
| 5,612,494 | 3/1997 | Shibano | 73/514.32 |

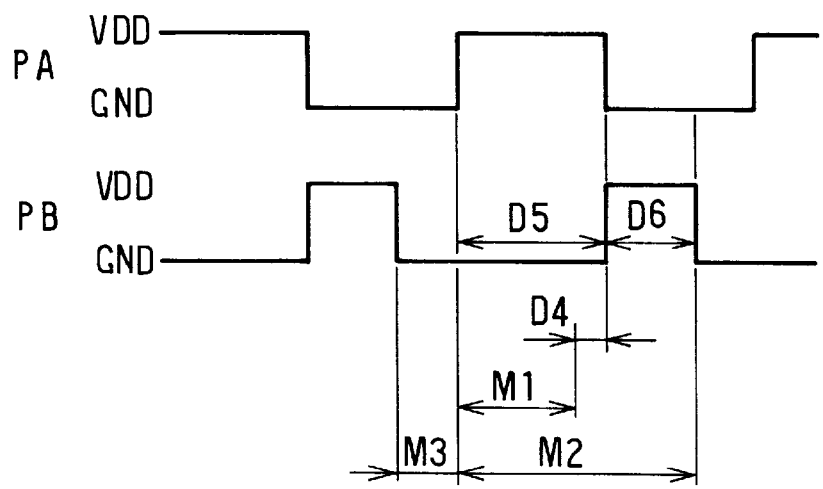
FIG. 4A
FIG. 4B
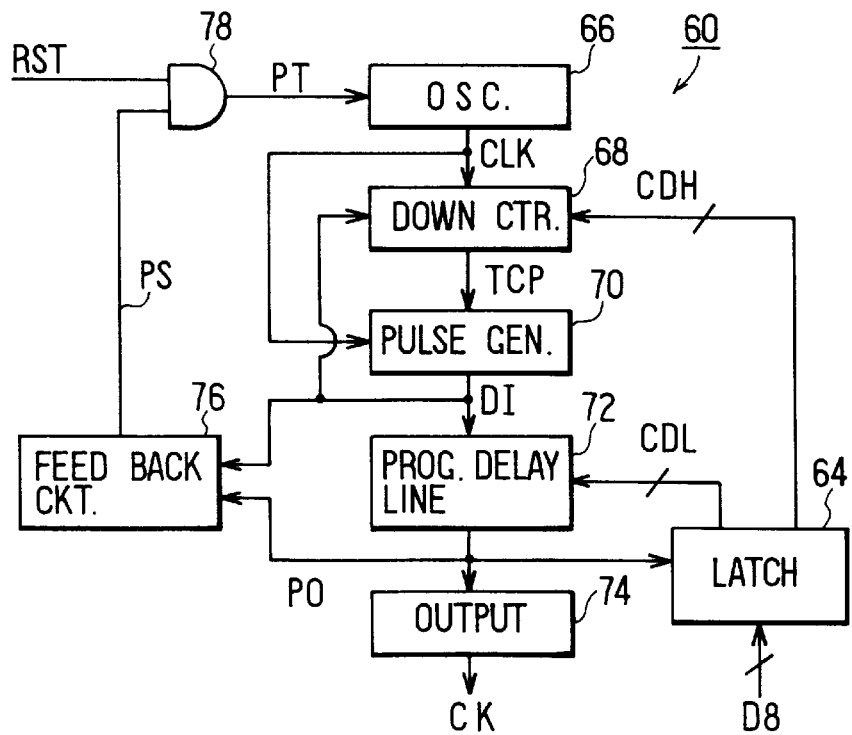
FIG. 5

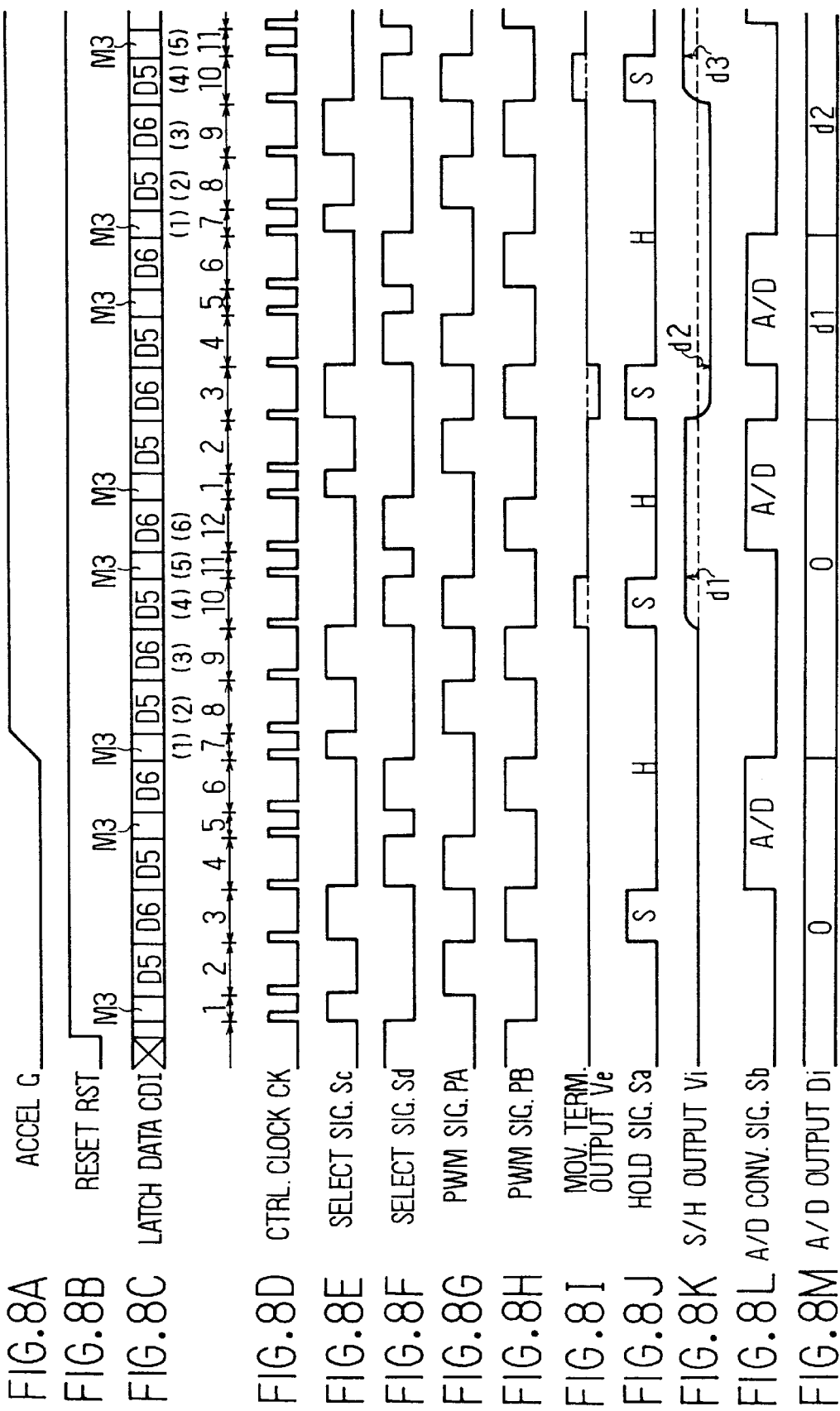

FIG. 9A  PA  
FIG. 9B  PB  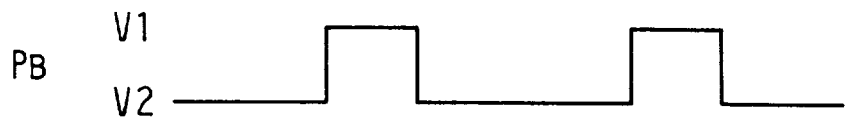
FIG. 9C  PA  
FIG. 9D  PB  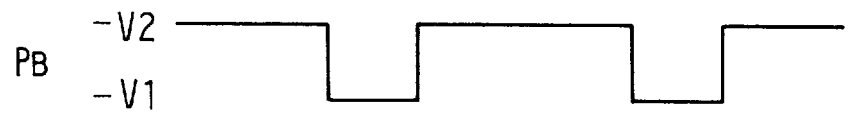
FIG. 10
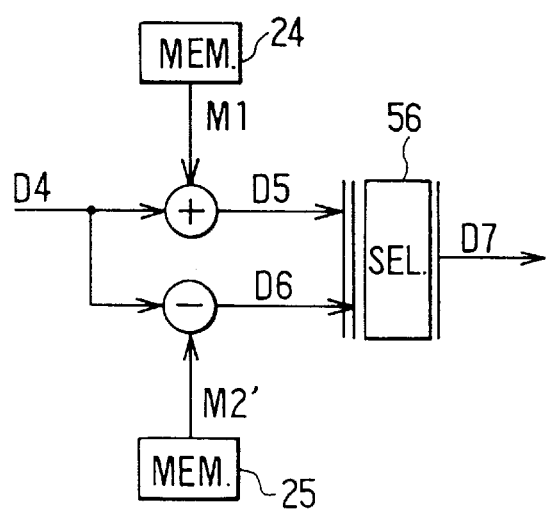

PHYSICAL QUANTITY DETECTING DEVICE

CROSS-REFERENCE TO RELATED APPLICATION

This application is related to and claims priority from Japanese Patent Application No. Hei 8-108315, incorporated herein by reference.

BACKGROUND OF THE INVENTION

1. Field of the Invention

This invention relates to a physical quantity detecting device for controlling the position of a movable electrode displaced in response to a predetermined physical quantity such as acceleration, a yaw rate or the like based on electrostatic forces produced by energizing fixed electrodes provided on both sides of the movable electrode as seen in its displacing direction, and detecting the physical quantity from a controlled variable on its position.

2. Description of Related Art

As this type of physical quantity detecting device, an acceleration sensor has heretofore been known which has a detecting element provided with a movable electrode and a pair of fixed electrodes, a capacitance detector for detecting a difference in capacitance between differential capacitors each composed of a movable electrode and respective fixed electrodes, and a pulse width modulator for generating pulse-width-modulated (PWM) signals having duty cycles proportional to the detected differential capacitance, where the output of the pulse width modulator is applied to one of the fixed electrodes as it is and applied to the other electrode through an inverter to alternately energize the pair of fixed electrodes, where the movable electrode is controlled to be held in position by electrostatic forces produced between the respective electrodes and the PWM signals are set as detected outputs.

However, the detecting element employed in such an acceleration sensor has a problem in that since it is fabricated on, for example, a semiconductor substrate by etching, detected sensitivity of the acceleration sensor and offsets of the detected outputs thereof vary due to variations in its fabrication.

On the other hand, for example, Japanese Patent Application Laid-Open Publication No. Hei 3-293565 discloses a device wherein the output of a pulse width modulator is applied to one of fixed electrodes through a first inverter and applied to the other electrode through a second inverter for further inverting the output of the first inverter, and a voltage value of a first reference voltage supply for supplying power to the first and second inverters can be adjusted and the output of a second reference voltage supply whose voltage value can be adjusted is added to the output of a capacitance detector by an adder.

In this device, crest values of PWM signals applied to the fixed electrodes through the first and second inverters, in turn, electrostatic forces produced between the fixed electrodes and a movable electrode upon energizing the fixed electrodes change. Therefore, the detected sensitivity can be adjusted by adjusting the voltage value of the first reference voltage supply. Further, errors produced in the output of the capacitance detector according to an offset of a detecting element can be canceled by adjusting the voltage value of the second reference voltage supply.

However, when the voltage value of each reference voltage supply is adjusted as in this type of device, some resistors constituting the reference voltage supply are normally formed as thin film resistors and the thin film resistors are trimmed to vary their resistance values, thereby varying the voltage value. Alternatively, each reference voltage supply must be composed of a D/A converter. Accordingly, such a prior art device has the following problems.

Namely, the trimming of the thin film resistors will cause a problem in that since the resistance values are changed by burning off a pattern with lasers, adjustment working requires time and effort, and the resistance values can be changed only in one direction to increase them, and thereby when voltage-value adjustments end in failure, the voltage value cannot be readjusted, thus creating a difficulty in its adjustment.

On the other hand, another problem arises in that since the number of elements increases as the D/A converter is improved in its adjustment accuracy where the D/A converter is used as the reference voltage supply, the elements are increased in size when one attempts to ensure sufficient adjustment accuracy, and particularly when the entire configuration is implemented in a semiconductor integrated circuit, the cost of a chip increases.

In order to allow adjustments to the detected sensitivity, the use of the aforementioned construction for adjusting the voltages requires that the fixed electrodes are alternately energized to control their energization ratio. Accordingly, the above-described problems cannot be avoided.

SUMMARY OF THE INVENTION

With the foregoing problems in mind, it is therefore an object of the present invention to provide a physical quantity detecting device capable of easily performing zero and sensitivity adjustments to a detecting element without an increase in its size.

According to a preferred embodiment of the present invention, the above object is achieved by providing a system including a switching device which selectively activates, at a predetermined ratio, a first energization control device for alternately energizing first and second fixed electrodes and a second energizing device for simultaneously energizing or deenergizing the first and second fixed electrodes.

Therefore, a detecting element is controlled based on a period (hereinafter called "effective or valid control period") in which an electrostatic force is alternately produced between the movable electrode and the first or second fixed electrode and an electrostatic force corresponding to an energization ratio set by duty control means is applied to the movable electrode on an average basis and a period (hereinafter called "ineffective or invalid control period") in which electrostatic forces do not act between the movable electrode and the first and second fixed electrodes or simultaneously act so as to cancel each other out, and hence no contribution is made to control the position of the movable electrode.

To understand this more clearly, assume that in the aforementioned prior art device, the mass of a movable electrode is represented as m, acceleration corresponding to a physical quantity acting on a detecting element is represented as G and an electrostatic force that acts on the movable electrode due to the energization of each fixed electrode is represented as Fe. In order to avoid a displacement in the movable electrode, the electrostatic force Fe needs to be controlled to match a force m×G intended to displace the movable electrode, which is produced by the acceleration G as expressed in Equation (1):

$$m \times G = Fe \quad (1)$$

Further, the electrostatic force Fe is given by the difference between an average electrostatic force Fa that acts between the movable electrode and one fixed electrode A and an average electrostatic force Fb that acts between the movable electrode and the other fixed electrode B as shown in Equation (2):

$$Fe = Fa - Fb \quad (2)$$

Assuming that an energization ratio relative to the fixed electrode A is represented as Da and an energization ratio relative to the fixed electrode B is represented as Db (Da+Db=1) and an electrostatic force obtained when only one fixed electrode is continuously energized, is represented as F, the relations in Equations (3) and (4) are obtained as follows:

$$Fa = F \times Da \quad (3)$$

$$Fb = F \times Db = F \times (1-Da) \quad (4)$$

Substituting them in Equations (1) and (2) yields Equation (5) shown below. Equation (6) is obtained by further changing Equation (5):

$$m \times G = Fe = Fa - Fb = F \times (2Da-1) \quad (5)$$

$$Da = \tfrac{1}{2} + (m \times G)/2F \quad (6)$$

As is apparent from the second term in Equation (6), it is impossible to adjust the mass m of the movable electrode because it is determined upon fabrication. Accordingly, the method for adjusting the detected sensitivity is limited to changing the voltages required to energize the fixed electrodes for producing the electrostatic force F.

In contrast, according to this aspect of the present invention, the suitable setting of the length of the invalid control period not contributing to the control on the position of the movable electrode allows adjustments to the detected sensitivity of the detecting element without changes in the energization voltages for the fixed electrodes. Further, the device can be reduced in size because it is unnecessary to use the adjustable reference voltage supply as in the conventional device.

Namely, assuming that a physical quantity to be detected is represented as acceleration G and the ratio of the invalid control period to the valid control period is represented as Dx (where Da+Db=1), the above Equations (3) through (6) are rewritten as the following Equations (7) through (10):

$$Fa = 1/(1+Dx) \cdot F \times Da \quad (7)$$

$$Fb = 1/(1+Dx) \cdot F \times Db = 1/(1+Dx) \cdot F \times (1-Da) \quad (8)$$

$$m \times G = Fe = Fa - Fb = 1/(1+Dx) \cdot F \times (2Da-1) \quad (9)$$

$$Da = \tfrac{1}{2} + (1+Dx) \cdot m \times G/2F \quad (10)$$

As is apparent from the second term on the right side of Equation (10), the detected sensitivity relative to the acceleration G can be adjusted by adjusting the invalid control period (the ratio Dx relative to the valid control period in the equation).

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 4A and 4B are graphs showing PWM signals generated from a signal processor in the first embodiment;

FIG. 5 is a block diagram showing a configuration of a digitally-controlled oscillator in the first embodiment;

FIGS. 8A–8M are graphs showing the operation of the acceleration sensor employed in the first embodiment;

FIGS. 9A–9D are graphs showing other PWM signals in the first embodiment;

FIG. 10 is a block diagram showing another configuration for generating data D5 and D6 corresponding to times required to energize fixed electrodes in the first embodiment;

DETAILED DESCRIPTION OF THE PRESENTLY PREFERRED EXEMPLARY EMBODIMENTS

Preferred embodiments of the present invention will hereinafter be described with reference to the accompanying drawings.

Figure 1:
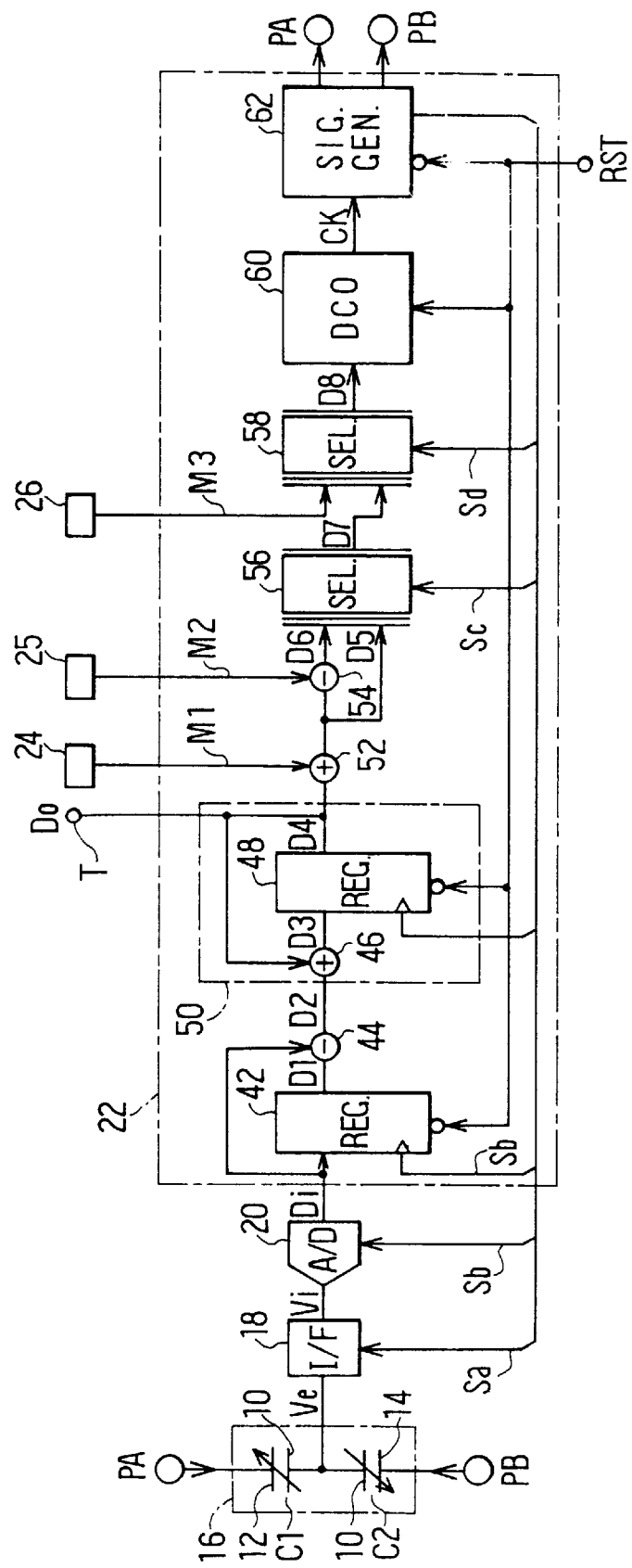
FIG. 1 is a block diagram showing an entire configuration of an acceleration sensor according to a first preferred embodiment of the present invention.

FIG. 1 is a block diagram showing an overall configuration of an acceleration sensor according to a first preferred embodiment of the present invention.

As shown in FIG. 1, the acceleration sensor according to the present embodiment comprises a sensor element 16 which has displaceable and movable electrodes 10 and fixed electrodes 12 and 14 respectively provided on both sides of the movable electrodes 10 and which constitutes a differential capacitor including a pair of capacitors C1 and C2 respectively composed of the movable electrodes 10 and the fixed electrodes 12 and 14, an interface 18 for taking out a voltage signal Ve from each movable electrode 10 at a predetermined timing, an A/D converter 20 for converting an analog signal Vi outputted from the interface 18 into digital data Di, a signal processor 22 for generating pulse-width-modulated (PWM) signals PA and PB applied to the respective fixed electrodes 12 and 14 of the sensor element 16 based on the digital data Di outputted from the A/D converter 20 and outputting a detected output Do corresponding to acceleration applied to the sensor element 16, and memories 24, 25 and 26 for storing various data M1, M2 and M3 for adjusting the sensitivity and offsets of the detected output Do. These components are formed on the same semiconductor chip.

Figure 2:
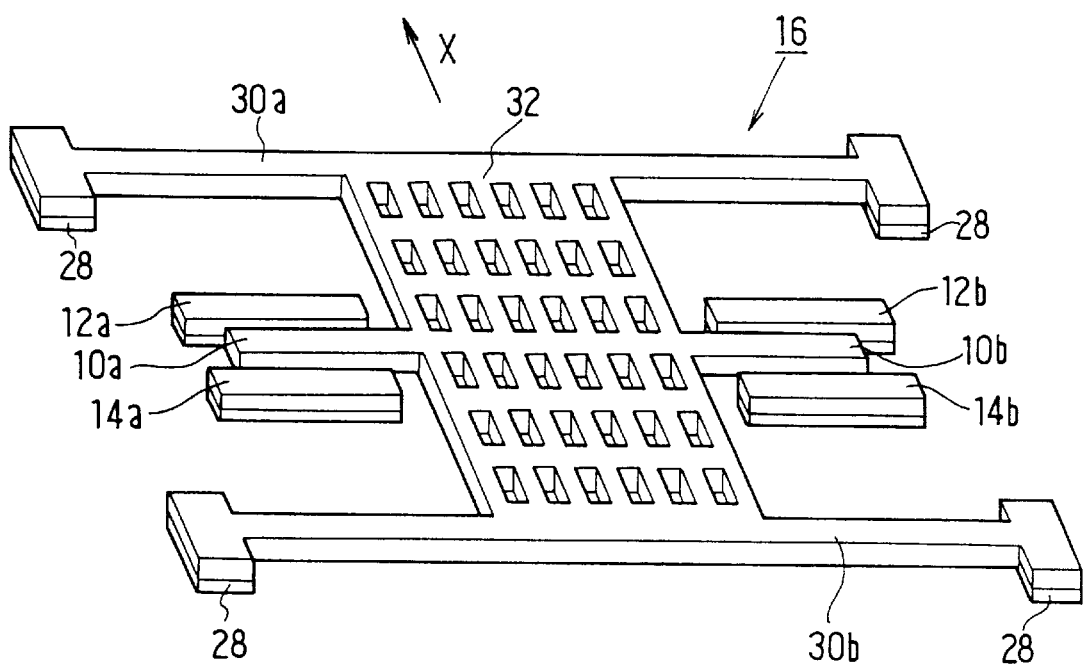
FIG. 2 is a perspective view showing a configuration of a sensor element employed in the first embodiment shown in FIG. 1.

FIG. 2 is a perspective view showing the entire configuration of the sensor element 16.

As shown in FIG. 2, the sensor element 16 includes a pair of bar-like beam portions 30a and 30b whose ends are respectively fixed onto a silicon substrate through insulating films 28 and which are provided in parallel, a mass portion 32 shaped in grid form for spanning the respective beam portions 30a and 30b, movable electrodes 10a and 10b which respectively protrude from both sides of the mass portion 32 to extend in parallel with the beam portions 30a and 30b substantially in the center between the beam portions 30a and 30b, and fixed electrodes 12a and 14a, and 12b and 14b respectively and oppositely disposed on the silicon substrate to interpose the movable electrodes 10a and 10b therebetween with predetermined spaces.

A combination of the beam portions 30a and 30b, the mass portion 32 and the movable electrodes 10a and 10b is collectively called "movable portion". The movable electrodes 10a and 10b (hereinafter called simply "movable electrode 10" in combination) are in electrical contact with each other.

The fixed electrodes 12a and 12b (hereinafter called merely "fixed electrode 12" in combination) provided between the movable electrode 10 and the beam portion 30a are brought into electrical contact with each other and form the capacitor C1 together with the movable electrode 10. Similarly, the fixed electrodes 14a and 14b (hereinafter called merely "fixed electrode 14" collectively) disposed between the movable electrode 10 and the beam portion 30b are in electrical contact with each other and form the capacitor C2 together with the movable electrode 10.

In the sensor element 16 constructed in this way, the capacitances of the capacitors C1 and C2 change when the movable portion is displaced in the direction orthogonal to the longitudinal directions of the beam portions 30a and 30b. Namely, when the movable portion is displaced in the direction indicated by X in FIG. 2, for example, the interval between the movable electrode 10 and the fixed electrode 12 is lessened and the interval between the movable electrode 10 and the fixed electrode 14 is opened up. As a result, the capacitance of the capacitor C1 increases, whereas the capacitance of the capacitor C2 decreases. When no acceleration is acting on the sensor element 16, the movable electrode 10 is placed in between the fixed electrodes 12 and 14 (at the midpoint position therebetween) and is formed so that the capacitances of the capacitors C1 and C2 are equal to each other.

When voltages are applied between the movable electrode 10 and the fixed electrode 12 of the sensor element 16 and between the movable electrode 10 and the fixed electrode 14 thereof, the movable electrode 10 is changed in position according to electrostatic forces produced between the respective electrodes. Namely, the position of the movable electrode 10 can be controlled by controlling the electrostatic forces.

Figure 3:
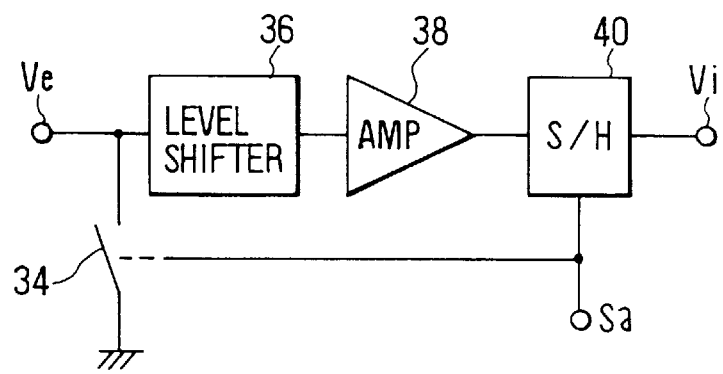
FIG. 3 is a block diagram showing a configuration of an interface in the first embodiment.

Next, the interface 18 includes, as shown in FIG. 3, a switch 34 for grounding the movable electrode 10 when a hold signal Sa is a Low level, a level shifter 36 for level-shifting the voltage signal Ve produced from the movable electrode 10, an amplifier (AMP) 38 for amplifying the output of the level shifter 36, and a sample-and-hold (S/H) circuit 40 for sampling the output of the amplifier 38 at the trailing edge of the hold signal Sa and holding the level of the hold signal Sa while the hold signal Sa is being at the Low level. Incidentally, the level shifter 36 is used to convert the level of the voltage signal Ve into an input level at which the amplifier 38 is operable.

Next, in the signal processor 22 as shown in FIG. 1, the digital data Di obtained from the A/D converter 20 is stored in a register 42 at the rise timing of an A/D conversion signal Sb and the difference between the digital data Di and a value D1 stored in the register 42 is calculated by a subtractor 44. The subtractor 44 inverts the direction of the subtraction each time the data is stored in the register 42, i.e., it alternately outputs D1−Di and Di−D1 as a subtracted value D2.

The subtracted value D2 is added to a value D4 stored in a register 48 by an adder 46. The resultant added value D3 is stored in the register 48 at the rise timing of the A/D conversion signal Sb. Namely, the adder 46 and the register 48 are constituted as an integrator 50 for integrating the subtracted value D2. Further, the value D4 stored in the register 48 is outputted through an output terminal T as an output Do detected by the corresponding acceleration sensor.

The value D4 is added to reference data M1 to be described later, which has been stored in the memory 24, by an adder 52. Data D5 (=M1+D4) corresponding to the added value is subtracted from effective or valid control period data M2 to be described later, which has been stored in the memory 25, to determine data D6 (=M2−D5).

In response to a select signal Sc, a selector 56 selects and outputs the data D5 if it is of a High level, and selects and outputs the data D6 if it is of a Low level. In response to a select signal Sd, a selector 58 selects and outputs ineffective or invalid control period data M3 (to be described later) stored in the memory 26 if it is of the High level, and selects and outputs output data D7 of the selector 56 if it is of the Low level.

Namely, the selectors 56 and 58 select any of the data D5, D6 and M3 as data D8 to be inputted to a digitally-controlled oscillator 60 in accordance with the select signals Sc and Sd.

The digitally-controlled oscillator 60 generates a control train clock CK having a pulse interval corresponding to the input data D8. A signal generator 62 generates PWM signals PA and PB for providing energization for the fixed electrodes 12 and 14 and the aforementioned hold signal Sa, A/D conversion signal Sb and select signals Sc and Sd, based on the control train clock CK.

Incidentally, the registers 42 and 48, the digitally-controlled oscillator 60 and the signal generator 62 are respectively supplied with a reset signal RST kept at the Low level by a predetermined period immediately after the turning on of the power and subsequently kept at the High level.

FIGS. 4A and 4B are graphs showing the PWM signals PA and PB generated by the signal generator 62.

As shown in FIGS. 4A and 4B, the PWM signals PA and PB consist of a valid control period for bringing either of them to a High level and an invalid control period for bringing the two to a Low level, respectively. The valid control period is determined by setting the valid control period data M2 and the invalid control period is determined by setting the invalid control period data M3. Further, the High level period of the PWM signal PA is determined by the data D5 obtained by adding the data D4 to the reference data M1, whereas the High level period of the PWM signal PB is determined by the data D6 obtained by subtracting the data D5 from the valid control period data M2. Incidentally, each of the PWM signals PA and PB serves as a power supply voltage VDD when it is High in level and serves as a ground voltage GND when it is Low in level.

In the sensor element 16 in which such PWM signals PA and PB are applied to the fixed electrodes 12 and 14 respectively, the capacitors C1 and C2 are charged during the High level period and discharged during the Low level period according to the levels of their corresponding PWM signals PA and PB when the switch 34 is closed, i.e., the movable electrode 10 is grounded.

On the other hand, when the switch 34 is opened, an electrical charge is transferred between the capacitors C1 and C2 according to changes in the levels of the PWM signals PA and PB. Particularly when the. PWM signals PA and PB are simultaneously changed, the voltage Ve outputted from the movable electrode 10 is kept at the ground potential GND if the capacitors C1 and C2 are equal in capacitance. Further, if the capacitors C1 and C2 are different in capacitance, then the output voltage Ve is set according to the difference between the capacitances thereof. The output voltage Ve at this time becomes a negative potential when the application of a bias voltage to the capacitors C1 and C2 is changed from the high capacitance side of the capacitance to its low capacitance side according to the changes in the PWM signals PA and PB. On the other hand, when its application is changed from the low capacitance side to its high capacitance side, the output voltage Ve becomes a positive potential.

Thus, the sensor element 16 can detect changes in the capacitances of the capacitors C1 and C2, in turn, a displacement in the movable electrode 10 from a change in the output voltage Ve of the movable electrode 10, which occurs when the PWM signals PA and PB simultaneously change. Further, the sensor element 16 can control the position of the movable electrode 10 by controlling the duty ratio of the PWM signals PA to PB, i.e., the ratio between the times required to energize the fixed electrodes 12 and 14 and varying the electrostatic forces acting between the movable electrode 10 and the fixed electrode 12 and between the movable electrode 10 and the fixed electrode 14.

A period or cycle (M2+M3) of each of the PWM signals PA and PB is set to become sufficiently smaller than the cycle of a natural oscillation (several hundred Hz to a few KHz or so) of the movable portion in such a manner that the movable portion does not vibrate according to energization switching to the fixed electrodes 12 and 14.

Next, FIG. 5 is a block diagram showing a configuration of the digitally-controlled oscillator 60.

As shown in FIG. 5, the digitally-controlled oscillator 60 includes a data latch 64 for latching the data D8 inputted thereto from the selector 58 as control data CDI and outputting the latched control data CDI in two parts: lower bit data CLD of lower 5 bits and upper bit data CDH from a sixth bit and above. The oscillator 60 also includes an oscillator 66 for outputting an oscillation pulse CLK at predetermined time intervals when a control pulse PT is a High level and a down counter 68 for counting the oscillation pulse CLK outputted from the oscillator 66 and outputting a detection signal TCP when a value counted by the down counter 68 has reached a value corresponding to the upper bit data CDH outputted from the data latch 64. Further, the oscillator 60 includes a pulse generator 70 for taking in or capturing the oscillation pulse CLK when the detection signal TCP is outputted from the down counter 68 and outputting a pulse signal DI based on the oscillation pulse CLK and a programmable delay line 72 for delaying the pulse signal DI outputted from the pulse generator 70 by a delay time corresponding to the lower bit data CDL outputted from the data latch 64. The oscillator 60 also includes an output circuit 74 for outputting a delay pulse PO outputted from the programmable delay line 72 therefrom as it is, a feedback circuit 76 for receiving therein the pulse signal DI outputted from the pulse generator 70 and the delay pulse PO outputted from the programmable delay line 72, stopping the oscillation of the oscillator 66 upon inputting of the pulse signal DI and resuming the oscillation of the oscillator 66 upon inputting of the delay pulse PO, and an AND circuit 78 for stopping the oscillation of the oscillator 66 when the reset signal RST is of the Low level and supplying an oscillation control, signal PS outputted from the feedback circuit 76 to the oscillator 66 as a control pulse PT when the reset signal RST is of the High level.

The oscillator 66 is constructed by connecting a NAND gate and a plurality of inverters in ring form. The oscillator 66 is a known ring oscillator capable of controlling a cyclic operation of a pulse signal in accordance with an input signal (here, control signal PT). A time interval of the oscillation pulse CLK is set to be a delay corresponding to 32 stages ($2^5$) of inverters.

The programmable delay line 72 includes a plurality of paths which are formed by connecting a plurality of inverters different in delay time from one another in series, a multiplexer for selecting any of the plurality of paths as a path for the input signal, etc. The programmable delay line 72 can switch the delay time to 32 stages according to the lower bit data CDL with a one-stage inverter as a unit delay.

The operation of the digitally-controlled oscillator 60 constructed as described above will be described with reference to a timing chart shown in FIGS. 6A–6I.

Figure 6:
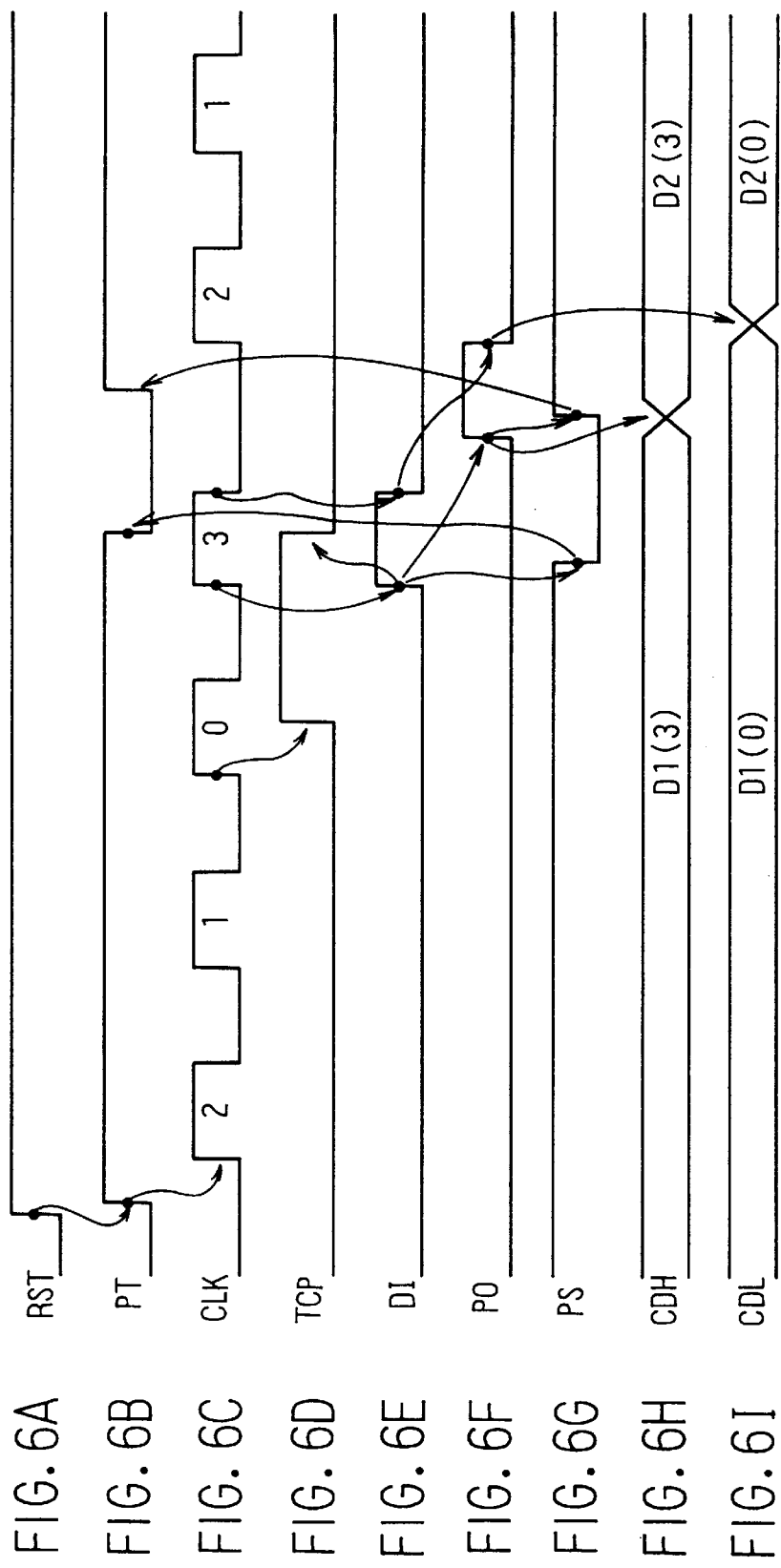
FIGS. 6A–6I are graphs showing the operation of the digitally-controlled oscillator in the first embodiment.

When a reset signal RST rises as shown in FIG. 6A, a control pulse PT (FIG. 6B) is brought to a High level so that an oscillation pulse CLK (FIG. 6C) is outputted from the oscillator 66 at predetermined time intervals equivalent to delay times of the 32 inverters and the down counter 68 counts down the oscillation pulse CLK. Here, assume that a predetermined value has been already written into the data latch 64 in advance prior to the rising of the reset signal RST.

Next, when the oscillation pulse CLK is outputted from the oscillator 66 by upper bit data CDH (corresponding to 3 here) (FIG. 6H), the down counter 68 outputs a detection signal TCP (FIG. 6D). Thereafter, the detection signal TCP is delayed by the pulse generator 70 so that a pulse signal DI (FIG. 6I) synchronized with the next oscillation pulse CLK outputted from the oscillator 66 is outputted from the pulse generator 70. Incidentally, the down counter 68 is preset by an oscillation pulse CLK produced firstly after the output of the detection signal TCP.

Next, the pulse signal DI outputted from the pulse generator 70 is delayed by a predetermined time corresponding to lower bit data CDL (FIG. 6I) by the programmable delay line 72 and outputted as a delay pulse PO (FIG. 6F). The delay pulse PO is outputted via the output circuit 74 and inputted to the signal generator 62 as a control clock CK.

On the other hand, the delay pulse PO is also inputted to the feedback circuit 76. Since the feedback circuit 76 is reset by the pulse signal DI outputted from the pulse generator 70 and set by the delay pulse PO outputted from the programmable delay line 72, an oscillation control signal PS (FIG. 6G) outputted from the feedback circuit 76 is kept at a Low level during a period between the leading edge of the pulse signal DI and the leading edge of the delay pulse PO.

Next, since the oscillation control signal PS is inputted to the oscillator 66 through the AND circuit 78, the oscillator 66 stops oscillating while the oscillation control signal PS is Low in level. After the delay pulse PO has risen, the oscillator 66 performs the same operation as described above again. Incidentally, the delay pulse PO is also inputted to the data latch 64 and serves to update the control data CDI.

Since the digitally-controlled oscillator 60 is substantially identical to the circuit which has previously been proposed in Japanese Patent Application No. Hei 4-227492 (the oscillator 60 is different only in AND circuit 78 from the aforementioned circuit), a further detailed description will therefore be omitted.

Thus, the digitally-controlled oscillator 60 generates the control train clock CK having the pulse interval corresponding to the data D8 latched in the data latch 64 as the control data CDI and sets the pulse interval with the one-stage inverter as the unit delay.

Figure 7:
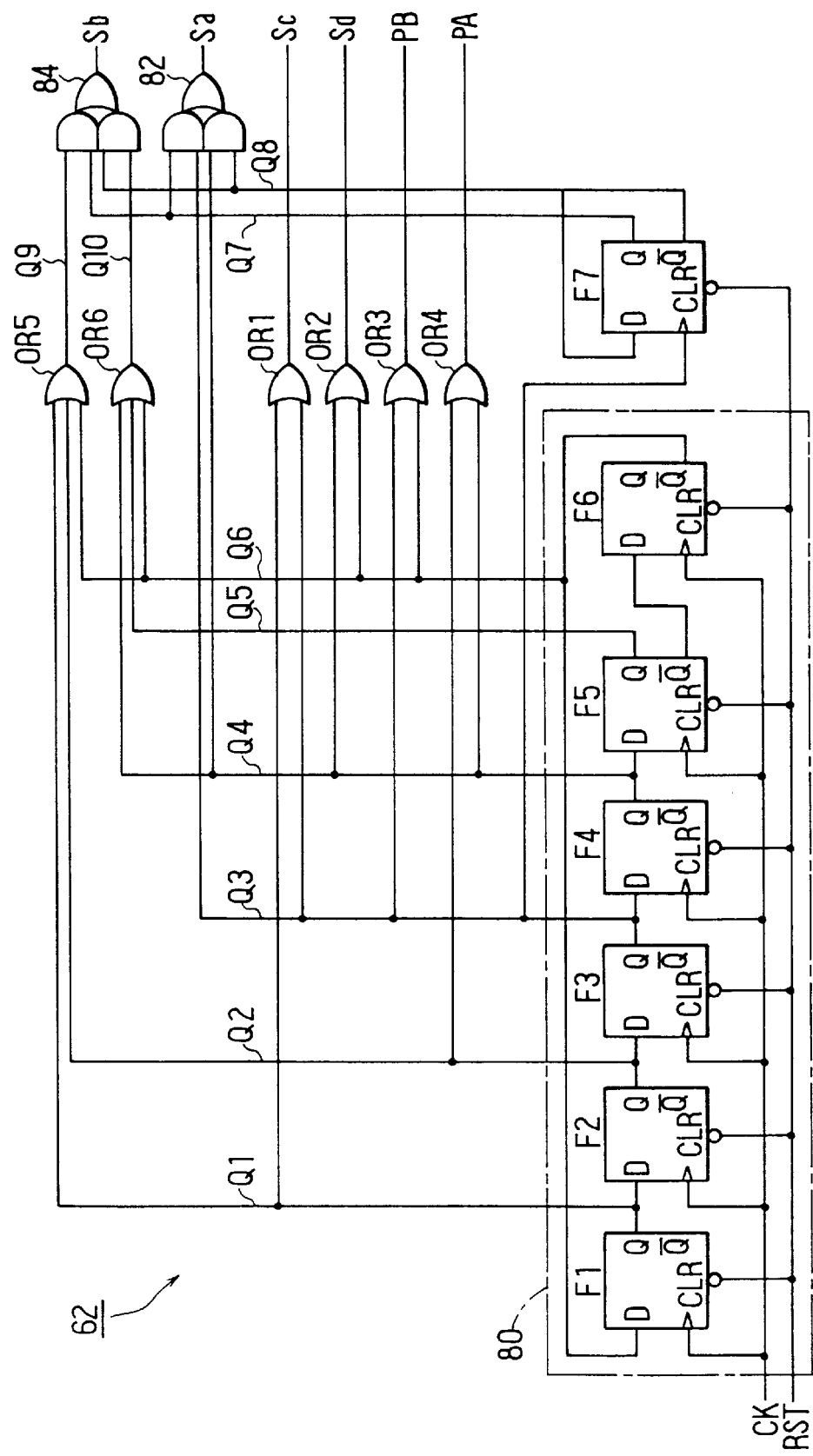
FIG. 7 is a circuit diagram showing a configuration of a signal generator in the first embodiment.

Next, FIG. 7 is a circuit diagram showing a detailed configuration of the signal generator 62.

As shown in FIG. 7, the signal generator 62 includes a ring counter 80 composed of six flip-flops F1 through F6 and activated in response to a control train clock CK and a flip-flop F7 (whose positive output and inverted output will be regarded as Q7 and Q8 respectively) configured as a toggle circuit activated with an output Q3 (output of flip-flop Fn (where n=1 to 6) will hereinafter be called "Qn") of the flip-flop F3 as a clock. The signal generator 62 also includes an OR circuit OR1 for receiving the outputs Q1 and Q3 therein as inputs and generating a select signal Sc based on them, an OR circuit OR2 for receiving the outputs Q4 and Q6 therein as inputs and generating a select signal Sd based on them, an OR circuit OR3 for receiving the outputs Q3 and Q6 therein as inputs and generating a PWM signal PB based on them and an OR circuit OR4 for receiving the outputs Q2 and Q4 therein as inputs and producing a PWM signal PA based on them. The signal generator 62 further includes a logic circuit 82 for receiving the outputs Q3, Q4, Q7 and Q8 therein as inputs and generating a hold signal Sa composed of the ORing of both the AND of the outputs Q3 and Q7 and the AND of the outputs Q4 and Q8 and a logic circuit 84 for receiving therein as inputs an output Q9 of an OR circuit OR5 for inputting the outputs Q1, Q2 and Q6 therein, an output Q10 of an OR circuit OR6 for inputting the outputs Q4, Q5 and Q6 therein, and the outputs Q7 and Q8 and generating an A/D conversion signal Sb composed of the ORing of both the AND of the outputs Q7 and Q9 and the AND of the outputs Q8 and Q10.

In the ring counter 80, the flip-flops F1 through F5 respectively produce positive outputs as the outputs Q1 through Q5 and have inputs connected to the outputs Qn of the previous stages. Only the flip-flop F6 produces an inverted output as the output Q6 and has an input connected to the inverted output of the flip-flop F5 corresponding to the previous stage. Due to the configuration described above, upon reset, the ring counter 80 renders only the output Q6 High in level and thereafter successively renders the outputs Q1 through Q6 High in level each time the control train clock CK is inputted.

Further, the flip-flop F7 renders the output Q7 Low in level and the output Q8 High in level upon reset. Each time the output Q3 is brought to the High level, the signal levels of the outputs Q7 and Q8 are inverted.

Timing provided for each of the signals Sa, Sb, Sc, Sd, PA and PB generated from the signal generator 62 constructed in the above-described manner and the entire operation of the acceleration sensor will now be described with reference to a timing chart shown in FIGS. 8A–8M.

Assuming now that the select signals Sc and Sd (FIGS. 8E and 8F, respectively) inputted to the selectors 56 and 58 change with six clocks of the control train clock CK (FIG. 8D) as one cycle and an nth section is defined between an nth and an n+1th control clocks CK, the select signal Sc is rendered High in level during first and third sections, whereas the control signal Sd is rendered High in level upon reset and during fourth and sixth sections.

Upon reset (RST=L), data M3 is selected as data D8 to be inputted to the digitally-controlled oscillator 60 based on the select signal Sd. The data M3 is taken in the data latch 64 of the digitally-controlled oscillator 60 as control data CDI (FIG. 8C) in response to the initial control clock CK. Thus, the period up to the output of the second control clock CK, i.e., the length of the first section is set according to the data M3. During the first section, data D5 is selected as the data D8 to be inputted to the digitally-controlled oscillator 60 based on the select signals Sc and Sd and is captured by the digitally-controlled oscillator 60 in response to the second control clock CK. As a result, the length of the second section is determined depending on the data D5. Thereafter, data D8 selected based on the select signals Sc and Sd are successively captured by the digitally-controlled oscillator 60 in the same manner as described above. As a result, the lengths of the first through sixth sections are determined according to the data M3, D5, D6, D5, M3 and D6 respectively.

In a manner similar to the control signals Sc and Sd, the PWM signals PA and PB (FIGS. 8G and 8H, respectively) also change with six control clocks as one cycle. The PWM signal PA is rendered High in level during the second and fourth sections (i.e., a period corresponding to the data D5) to energize the fixed electrode 12 (i.e., to apply a bias voltage to the capacitor C1). On the other hand, the PWM signal PB is rendered High in level during the third and sixth sections (i.e., a period corresponding to the data D6) to supply electricity to the fixed electrode 14 (apply a bias voltage to the capacitor C2).

During the first and fifth sections (i.e., a period corresponding to the data M3), an invalid control period is produced in which either of the PWM signals PA and PB is brought to the Low level and no electricity is supplied to either of the fixed electrodes 12 and 14.

Next, the hold signal Sa (FIG. 8J) and the A/D conversion signal Sb (FIG. 8L) change with twelve control clocks CK as one cycle. The hold signal Sa is rendered High in level during the third and tenth sections, whereas the A/D conversion signal Sb is rendered High in level during the fourth through sixth sections and the twelfth through second sections.

Namely, the hold signal Sa at the third section serves so as to sample an voltage Ve (FIG. 8I) outputted from the movable electrode 10 when the application of a bias voltage is switched from the capacitor C1 to the capacitor C2 and to hold it as data Vi (FIG. 8K) to be inputted to the A/D converter 20. On the other hand, the hold signal Sa at the tenth section serves so as to sample an output voltage Ve at the time that the application of the bias voltage is reversely changed from the capacitor C2 to the capacitor C1 and to hold it as input data Vi.

Since the movable electrode 10 is grounded via the switch 34 when the hold signal Sa is Low in level, its output voltage Ve is always held as the ground voltage GND. This is intended for the prevention of detection of the influence of a change in the output voltage Ve of the movable electrode 10, which occurs even if the capacitors C1 and C2 are equal in capacitance to each other when only either one of the PWM signals PA and PB changes, i.e., in the case of an arrangement of M3→D5, D5→M3, M3→D6 and D6→M3.

In accordance with the A/D conversion signal Sb, the A/D converter 20 captures the input data Vi based on the hold signal Sa at the third section during the fourth through sixth sections and the input data Vi based on the hold signal Sa at the tenth section during the twelfth through second sections, and converts them into digital data Di (FIG. 8I).

The reason why the input data Vi based on the hold signal Sa at the tenth section is processed from the twelfth section with a space of one section left is because it is intended for the execution of processing of the A/D converter 20 with its processing time as a fixed time (time corresponding to D3+D5+D6).

The signal processor 22 for processing the digital signal Di outputted from the A/D converter 20 determines data D2 corresponding to the amplitude of the output voltage Ve of the movable electrode 10 and adds up or integrates the data D2 to thereby calculate data D4 as a detected output Do to be outputted and a control value to determine the duty between the PWM signals PA and PB. The signal processor 22 generates the PWM signals PA and PB based on the data D4 and the reference data M1, valid control period data M2 and invalid control period data M3 stored in the memories 24 through 26.

The reference data M1 and the valid control period data M2 are used to set the data D5 and D6 at the time that the data D4 is zero (D5=M1 and D6=M2−M1). Accordingly, the offset relative to the output voltage Ve of the movable electrode 10 is determined by setting the reference data M1 and the valid control period data M2.

Further, since the signal processor 22 controls the position of the movable electrode 10 so that the output voltage Ve reaches zero, the detected output Do has an offset corresponding to its controlled variable if the output voltage Ve has an offset. Namely, the offset of the output voltage Ve and the offset of the detected output Do, can be adjusted using the reference data M1 and the valid control period data M2.

The reference data M1 is normally set to bring the offset (and in turn, the offset of the detected output Do) of the output voltage Ve of the movable electrode 10 to zero. If the movable electrode 10 is properly at the neutral position, then the value is half the valid control period data M2.

In the acceleration sensor constructed in this way, the output voltage Ve of the movable electrode 10 becomes zero, and in turn, the data D4 becomes zero when no acceleration is acting on the sensor element 16 (G=0). Therefore, the fixed electrodes 12 and 14 are respectively energized at a rate determined by the reference data M1, the valid control period data M2 and the invalid control period data M3. The movable electrode 10 is held at the neutral position.

On the other hand, when an acceleration G (G≠0) is applied to the sensor element 16 and, for example, the movable electrode 10 is displaced in the direction in which the interval between the movable electrode 10 and the fixed electrode 12 becomes narrow, so that the capacitance of the capacitor C1 becomes greater than that of the capacitor C2 (C1>C2), a positive output voltage Ve is detected during the tenth section and a negative output voltage Ve is detected during the third section. In doing so, the data D4 is changed, and in turn, the data D5 and D6 are changed on the signal processor 22 side (the data D4 becomes a negative value, the data D5 decreases and the data D6 increases in the embodiment), whereby the time required to energize the fixed electrode 14, i.e., an electrostatic force intended to attract the movable electrode 10 toward the fixed electrode 14 increases.

As a result, the movable electrode 10 is shifted to a position where a force produced from the acceleration matches the electrostatic force. Thus, the movable electrode 10 is returned to its neutral position.

In doing so, the capacitors C1 and C2 become equal in capacitance to each other so that the output voltage Ve of the movable electrode 10 is brought to zero and hence the value of the data D4 is maintained as it is. Therefore, the PWM signals PA and PB whose duty at this time has been held, are subsequently outputted from the signal processor 22.

At this time, the force produced from the acceleration applied to the acceleration sensor matches the electrostatic force applied to the movable electrode 10 by energizing the fixed electrodes 12 and 14 in accordance with the PWM signals PA and PB. Accordingly, the data D4, i.e., the detected output Do indicative of a controlled variable for generating PWM signals PA and PB, depends on the acceleration.

In the present embodiment, the sensor element 16 corresponds to a detecting element. A portion for generating the second, third, fourth and sixth sections of the select signal Sc and the PWM signals PA and PB by the selector 56, the digitally-controlled oscillator 60 and the signal generator 62 corresponds to a first energizing means as recited in the appended claims. A portion, i.e., the memory 26 (memory means) for generating the first and fifth sections of the PWM signals PA and PB by the digitally-controlled oscillator 60 and the signal generator 62 corresponds to a second energizing means. A portion for generating the select signal Sd by the selector 58 and the signal generator 62 corresponds to a switching means. Other portions correspond to a duty control means. A portion for generating the hold signal Sa and the A/D conversion signal Sb by a configuration composed of the interface 18, the A/D converter 20 and the registers 42 through 48 of the signal processor 22, of the duty control means, and the signal generator 62 corresponds to an integrating means. The memories 24 and 25 correspond to a reference value storing means. The adder 52 and the subtractor 54 correspond to an arithmetic or computing means.

In the acceleration sensor according to the present embodiment as has been described above, the sensor element 16 is controlled by the valid control period during which the fixed electrodes 12 and 14 are selectively energized and the electrostatic force corresponding to its energization ratio acts on the movable electrode 10 and the invalid control period during which neither the fixed electrode 12 nor the fixed electrode 14 is energized and they do not contribute to the control on the position of the movable electrode 10. Further, the length of the invalid control period is determined in accordance with the invalid control period data M3 indicative of the value set to the memory 26.

Thus, according to the acceleration sensor of the present embodiment, the sensitivity of the detected output Do to the acceleration can be adjusted easily and at low cost by simply changing the value set to the memory 26.

In the acceleration sensor according to the present embodiment, the time (i.e., the duty on the PWM signals PA and PB during the valid control period) required to energize the fixed electrodes 12 and 14 at the time that the data D4 (detected output Do) is zero, is determined by the reference data M1 and the valid control period data M2 indicative of the values set to the memories 24 and 25. In other words, the offset of the output voltage Ve of the movable electrode 10, in turn, the offset of the detected output Do is changed according to the reference data M1 and the valid control period data M2.

Thus, according to the acceleration sensor of the present embodiment, the offset of the detected output Ve of the movable electrode 10 and the offset of the detected output Do can be also adjusted easily and at lower cost by simply changing the values set to the memories 24 and 25 in a manner similar to the sensitivity of the detected voltage Ve of the movable electrode 10 to the acceleration.

According to the acceleration sensor of the present embodiment as well, since the pulse widths of the PWM signals PA and PB for controlling energization of the fixed electrodes 12 and 14 can be changed with the delay of one-stage inverter as the unit, the electrostatic forces produced between the movable electrode 10 and the fixed electrodes 12 and 14 can be controlled with satisfactory accuracy, in turn, the acceleration can be detected with satisfactory accuracy.

Further, according to the acceleration sensor of the present embodiment, since the detected output Do is converted into digital data as numbers, it can be directly taken in the CPU or the like. Accordingly, a system for executing control on various controlled devices based on the acceleration detected by the acceleration sensor can be configured easily.

In the above-described embodiment, all the components of the acceleration sensor are formed on the same semiconductor chip. However, since ones different in shape from each other are used as the sensor element 16 where relatively low acceleration is detected and relatively high acceleration is detected, the sensor element 16 and other circuit portions may be formed on different chips as a two-chip configuration so that the sensor element 16 can be replaced with another according to various purposes.

Since the signal processor 22 processes only the digital signal, some or all of the processes of the signal processor 22 may be implemented by use of a CPU or DSP.

In the aforementioned embodiment as well, the High levels of the PWM signals PA and PB are set as the power supply voltage VDD and the Low levels thereof are set as the ground voltage GND. However, the High level and Low level may be set to V1 and V2 using arbitrary voltage levels V1 and V2 respectively as shown in FIGS. 9A and 9B. Alternatively, as shown in FIGS. 9C and 9D, the High and Low levels of the PWM signal PA may be set to V1 and V2 respectively, and the High and Low levels of the PWM signal PB may be set to -V2 and -V1 respectively.

Although the electrostatic forces are produced between the movable electrode 10 and the respective fixed electrodes 12 and 14 even during the invalid control period in this case, they cancel each other, and this will be equivalent to the non-occurrence of the electrostatic forces. If the movable electrode 10 is configured to be electrically connected to the voltage V2 through the switch 34 in FIGS. 9A and 9B, then the electrostatic forces can be prevented from acting during the invalid control period in a manner similar to the above-described embodiment.

In the above-described embodiment as well, the data D6 indicative of the High level period of the PWM signal PB is determined by subtracting the data D5 indicative of the High level period of the PWM signal PA from the valid control period data M2. However, as shown in FIG. 10, such second reference data M2' that a value represented in total together with reference data M1 reaches valid control period data M2, is stored in the memory 25 and thereafter data D6 may be determined by subtracting data D4 from the second reference data M2'.

Further, in the above-described embodiment, in order to detect the difference between the capacitances of the capacitors C1 and C2 of the sensor element 16, the output voltages Ve at the movable electrode 10 are measured when the application of the bias voltage is changed over from the capacitor C1 to the capacitor C2 (during the third section) and vise versa (during the tenth section), and the difference between the measured voltages is determined, whereby a sensitivity twice that which is obtained when the output voltage is measured during either one thereof alone has been obtained. However, if the sensitivity of the sensor element 16 is high enough, then the output voltage may be measured during either one thereof alone.

Moreover, in the above-described embodiment, the arrangement of the data selected as the data D8 to be inputted to the digitally-controlled oscillator 60 has been set as in the case of M3→D5→D6→D5→M3→D6 to ensure the predetermined period corresponding to the data (M3+D5+D6) as the processing time of the A/D converter 20. However, since the processing period can be shortened if a high-speed A/D converter such as a parallel type A/D converter is used, for example, an arrangement of M3→D5→D6→M3→D6→D5 or an arrangement of M3→D5→D6→D5→D6→M3 may be selected. If the output voltage Ve of the movable electrode 10 is measured upon either one of the switching of the application of the bias voltage from the capacitor C1 to the capacitor C2 or the switching of the application thereof from the capacitor C2 to the capacitor C1, then an arrangement of M3→D5→D6 or M3→D6→D5 may be selected.

A second embodiment of the present invention will next be described.

In the sensor element 16 of the acceleration sensor according to the first embodiment, the movable electrode 10 and the fixed electrodes 12 and 14 are shared for the displacement detection of the movable portion and the position control thereof. However, the displacement detection of the movable portion may be performed by another means, using a sensor element 90 shown in FIG. 12.

Figure 12:
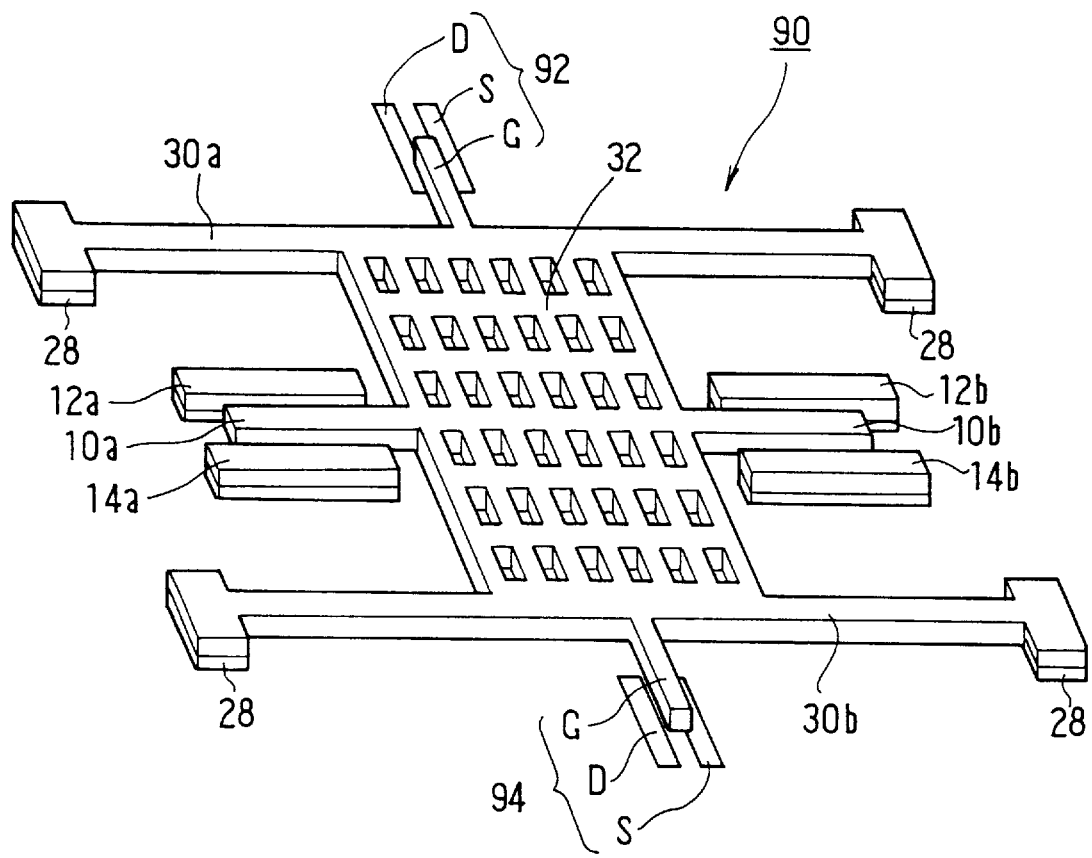
FIG. 12 is a perspective view illustrating a configuration of a sensor element employed in the second embodiment.

Namely, as shown in FIG. 12, the sensor element 90 includes movable electrodes G that respectively protrude substantially from the centers of respective beam portions 30a and 30b in the opposite direction of a mass portion 32, and fixed electrodes S and D composed of impurity diffusion layers, which are formed on a silicon substrate just below the movable electrodes G so as to be in parallel to the movable electrodes G and interpose the respective movable electrodes G therebetween, in addition to the sensor element 16 employed for the first embodiment. The movable electrode G is defined as a movable gate and the fixed electrodes S and D are respectively defined as a source and a drain. A pair of MIS (Metal Insulator Semiconductor) type transistors 92 and 94 with spaces defined between the movable electrodes G and the fixed electrodes S and D as insulative layers is provided.

The movable electrode G and the fixed electrodes S and D are formed so that substantially half of their areas are opposed to each other when the movable portion G is placed in a neutral position. Incidentally, the beam portions 30a and 30b, the mass portion 32, the movable electrode 10 and the movable electrodes G will be called a "movable portion" altogether.

When the voltage is applied to the movable electrodes G of the MIS type transistors 92 and 94 in the sensor element 90 constructed in this way, a channel is formed at a portion opposed to the movable electrode G between the fixed electrodes S and D so that a drain current flows therethrough. Further, the width of the channel defined between the fixed electrodes S and D changes according to a displacement of the movable electrode G so that the drain current is modulated. The movable electrodes G of the transistors 92 and 94 are formed in the direction opposite to each other to extend along the direction in which the movable portion is displaced. Therefore, when the movable portion is displaced in the direction in which the interval between the movable electrode 10 and the fixed electrode 12 becomes narrow, the areas of the movable electrode G and fixed electrodes S and D of the MIS type transistor 92, which are opposite to each other, increase so that the drain current increases. In the MIS type transistor 94 on the other hand, their areas decreases in reverse so that the drain current is reduced.

In the sensor element 90 as described above, the movable electrode 10 and the fixed electrode 12 are used only for the position detection of the movable portion and the MIS type transistors 92 and 94 are used for the displacement detection of the movable portion.

Figure 11:
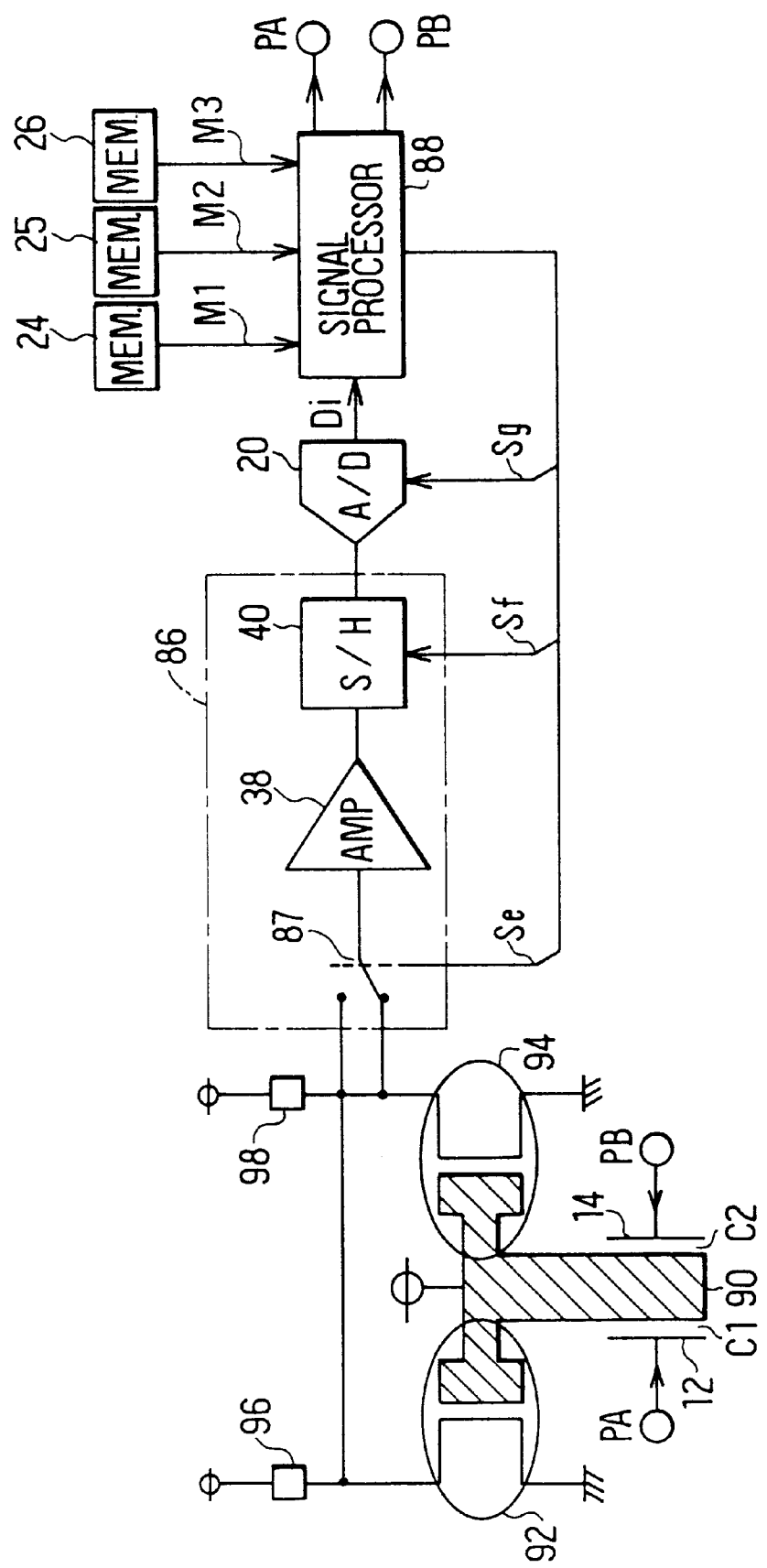
FIG. 11 is a block diagram showing an entire configuration of an acceleration sensor according to a second preferred embodiment of the present invention.

As shown in FIG. 11, the acceleration sensor according to the present embodiment, which has been constructed using such a sensor element 90, includes the sensor element 90 and resistors 96 and 98 electrically connected to respective drains of the MIS type transistors 92 and 94 for respectively converting drain currents into voltage signals. It also includes an interface 86 for taking in or capturing drain voltages of the transistors 92 and 94, an A/D converter 20 for converting the output of the interface 86 into numbers and outputting same as digital data Di, a signal processor 88 for generating pulse-width-modulated signals PA and PB applied to the fixed electrodes 12 and 14 based on the digital data Di outputted from the A/D converter 20, and memories 24, 25 and 26 for storing data M1, M2 and M3 therein. The same elements of structure as those employed in the first embodiment are identified by the same reference numerals and their detailed description will therefore be omitted.

The interface 86 comprises a switch 87 for capturing either one of the drain voltages of the transistors 92 and 94 in accordance with a select signal Se, an amplifier 38 for amplifying the drain voltage captured through the switch 87 and a sample-and-hold circuit 40 for sampling and holding the output of the amplifier 38 in response to a hold signal Sf.

Further, the signal processor 88 is precisely the same configuration as in the first embodiment except that a signal generator 62 employed therefor generates the switch signal Se, the hold signal Sf and an A/D conversion signal Sg in place of the hold signal Sa and the A/D conversion signal Sb.

Incidentally, the select signal Se has a signal level inverted in a predetermined cycle. Further, the hold signal Sf and the A/D conversion signal Sg may be ones for activating the sample-and-hold circuit 40 and the A/D converter 20 each time the level of the select signal Se is inverted.

In the acceleration sensor constructed in this way, the drain voltages of the transistors 92 and 94 are alternately captured by the interface 86. The captured drain voltage is converted into the digital data Di by the A/D converter 20, followed by supply to the signal processor 88. The PWM signals PA and PB are generated from the signal processor 88 in the same manner as in the first embodiment.

According to the acceleration sensor of the present embodiment as has been described above, since the displacement of the movable portion is detected by the MIS type transistors 92 and 94, a large current can be supplied as compared with the case in which the output corresponding to the capacitance equivalent to the difference in capacitance between the capacitors C1 and C2 is obtained. As a result, a device can be configured which is capable of reducing the input impedance of the. interface 86 for capturing the output of the sensor element 90 and of providing strong resistance to noise.

Since the drain voltage captured by the interface 86 is always represented as the output corresponding to the displacement of the movable portion, the displacement of the movable portion can be arbitrarily detected independently of the timing to energize the fixed electrodes 12 and 14.

In the present embodiment, the outputs of the MIS type transistors 92 and 94 are captured on a time-sharing basis. However, the A/D converters may be configured so as to be provided every outputs of the MIS type transistors 92 and 94 and simultaneously perform A/D conversion. In this case, the register 42 is omitted from the signal processor 88 and one obtained by performing simple subtraction on the two outputs of the A/D converters may be set as data D2.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A physical quantity detecting device comprising:

a movable electrode displaceable in response to a predetermined physical quantity;

first and second fixed electrodes disposed in opposing relationship with said movable electrode interposed therebetween to extend in a direction in which said movable electrode is displaced;

a detecting element for outputting an output signal corresponding to the displacement of said movable electrode;

first energizing means for alternately energizing said first and second fixed electrodes;

duty control means for controlling, based on the output signal obtained from said detecting element, an energization ratio of said first fixed electrode to said second fixed electrode by said first energizing means so that said movable electrode is placed in position;

second energizing means for simultaneously energizing and deenergizing said first and second fixed electrodes; and switching means for selectively activating said first energizing means and said second energizing means at a predetermined ratio.

2. A physical quantity detecting device according to claim 1, wherein said switching means has memory means for storing therein numeric data corresponding to a time interval required to activate said second energizing means and is for setting said activation time in accordance with contents of said memory means.

3. A physical quantity detecting device comprising:

a movable electrode displaced in response to a predetermined physical quantity;

first and second fixed electrodes disposed in opposing relationship with said movable electrode interposed therebetween to extend in a direction in which said movable electrode is displaced;

a detecting element for outputting an output signal corresponding to the displacement of said movable electrode;

first energizing means for alternately energizing said first and second fixed electrodes; and duty control means for controlling, based on the output signal obtained from said detecting element, an energization ratio of said first fixed electrode to said second fixed electrode by said first energizing means so that said movable electrode is placed in position;

said duty control means including:

means for storing therein reference values corresponding to a default reference energization ratio indicative of said energization ratio, integrating means for converting a value obtained by integrating the displacement of said movable electrode into a numerical value based on the signal outputted from said detecting element, and arithmetic means for performing arithmetic processing based on the reference values stored in said reference value storing means and the integrated value determined by said integrating means and determining time intervals required to energize said first and second fixed electrodes within a predetermined unit time to obtain an energization ratio corresponding to said integrated value;

wherein said first energizing means is for energizing said fixed electrodes in accordance with the energization time intervals calculated by said arithmetic means.

4. A physical quantity detecting device according to claim 3, wherein:

said reference value storing means is for storing therein as said reference values said predetermined unit time and a first reference energization time interval corresponding to the time interval required to energize said first fixed electrode within said predetermined unit time, which is determined in accordance with said reference energization ratio; and said arithmetic means includes:

an adder for adding the value integrated by said integrating means to the first reference energization time interval stored in said reference value storing means thereby to calculate the time interval required to energize said first fixed electrode, and a subtractor for subtracting an output value obtained from said adder from the unit time stored in said reference value storing means thereby to calculate the time interval required to energize said second fixed electrode.

5. A physical quantity detecting device according to claim 3, wherein:

said reference value storing means stores therein as said reference values a first reference energization time interval corresponding to the time interval required to energize said first fixed electrode within said predetermined unit time, which is determined in accordance with said reference energization ratio and a second reference energization time interval corresponding to the time interval required to energize said second fixed electrode; and said arithmetic means includes an adder for adding the value integrated by said integrating means to the first reference energization time interval stored in said reference value storing means to thereby calculate the time interval required to energize said first fixed electrode, and a subtractor for subtracting the value integrated by said integrating means from the second reference energization time interval stored in said reference value storing means to thereby calculate the time interval required to energize said second fixed electrode.

6. A physical quantity detecting device comprising:

a movable electrode displaceable in response to a predetermined physical quantity;

first and second fixed electrodes disposed in opposing relationship with said movable electrode interposed therebetween to extend in a direction in which said movable electrode is displaced;

a detecting element for outputting an output signal corresponding to the displacement of said movable electrode;

first energizing circuitry constructed and adapted to energize alternately said first and second fixed electrodes;

duty control circuitry constructed and adapted to control, based on the output signal obtained from said detecting element, an energization ratio of said first fixed electrode to said second fixed electrode by said first energizing circuitry so that said movable electrode is placed in position;

second energizing circuitry constructed and adapted to simultaneously energize and deenergize said first and second fixed electrodes; and switching circuitry constructed and adapted to selectively activate said first energizing circuitry and said second energizing circuitry at a predetermined ratio.

7. A physical quantity detecting device according to claim 6, wherein said switching circuitry has memory circuitry constructed and adapted to store therein numeric data corresponding to a time interval required to activate said second energizing circuitry and is for setting said activation time in accordance with contents of said memory circuitry.

8. A physical quantity detecting device comprising:

a movable electrode displaced in response to a predetermined physical quantity;

first and second fixed electrodes disposed in opposing relationship with said movable electrode interposed therebetween to extend in a direction in which said movable electrode is displaced;

a detecting element for outputting an output signal corresponding to the displacement of said movable electrode;

first energizing circuitry constructed and adapted to energize alternately said first and second fixed electrodes; and duty control circuitry constructed and adapted to control, based on the output signal obtained from said detecting element, an energization ratio of said first fixed electrode to said second fixed electrode by said first energizing circuitry so that said movable electrode is placed in position;

said duty control circuitry including:

value storing circuitry constructed and adapted to store therein reference values corresponding to a default reference energization ratio indicative of said energization ratio, integrating circuitry constructed and adapted to convert a value obtained by integrating the displacement of said movable electrode into a numerical value based on the signal outputted from said detecting element, and arithmetic circuitry constructed and adapted to perform arithmetic processing based on the reference values stored in said reference value storing circuitry and the integrated value determined by said integrating circuitry and determining time intervals required to energize said first and second fixed electrodes within a predetermined unit time to obtain an energization ratio corresponding to said integrated value;

wherein said first energizing circuitry is for energizing said fixed electrodes in accordance with the energization time intervals calculated by said arithmetic circuitry.

9. A physical quantity detecting device according to claim 8, wherein:

said reference value storing circuitry is for storing therein as said reference values said predetermined unit time and a first reference energization time interval corresponding to the time interval required to energize said first fixed electrode within said predetermined unit time, which is determined in accordance with said reference energization ratio; and said arithmetic circuitry includes:

an adder for adding the value integrated by said integrating circuitry to the first reference energization time interval stored in said reference value storing circuitry thereby to calculate the time interval required to energize said first fixed electrode, and a subtractor for subtracting an output value obtained from said adder from the unit time stored in said reference value storing circuitry thereby to calculate the time interval required to energize said second fixed electrode.

10. A physical quantity detecting device according to claim 8, wherein:

said reference value storing circuitry stores therein as said reference values a first reference energization time interval corresponding to the time interval required to energize said first fixed electrode within said predetermined unit time, which is determined in accordance with said reference energization ratio and a second reference energization time interval corresponding to the time interval required to energize said second fixed electrode; and said arithmetic circuitry includes:

an adder for adding the value integrated by said integrating circuitry to the first reference energization time interval stored in said reference value storing circuitry thereby to calculate the time interval required to energize said first fixed electrode, and a subtractor for subtracting the value integrated by said integrating circuitry from the second reference energization time interval stored in said reference value storing circuitry thereby to calculate the time interval required to energize said second fixed electrode.

* * * * *